UNITED STATES PATENT OFFICE.

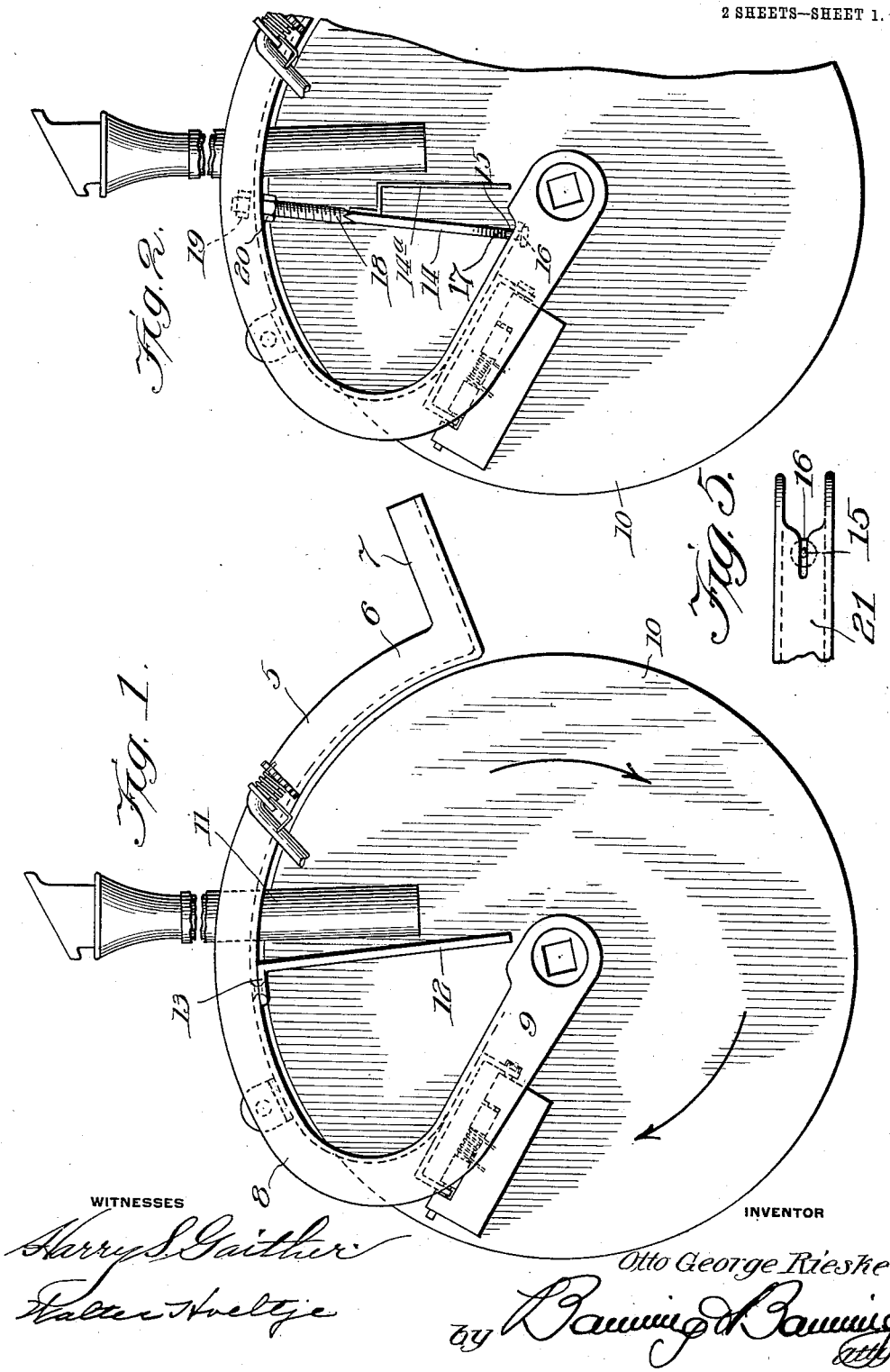
O. G. RIESKE.
GRAIN DRILL.
APPLICATION FILED JAN. 3, 1911.
1,017,319.
Patented Feb. 13, 1912.
2 SHEETS—SHEET 1.

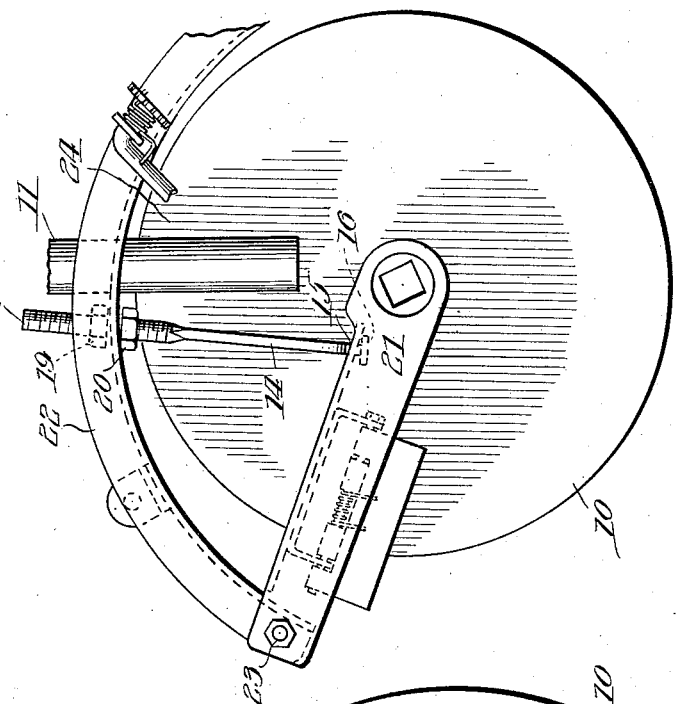
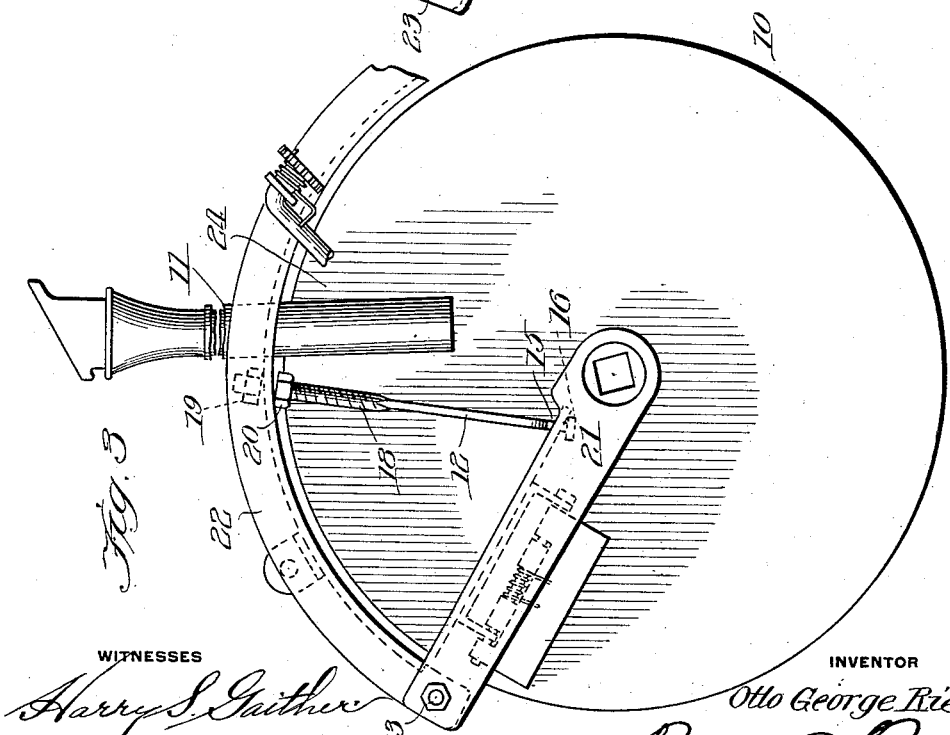

OTTO GEORGE RIESKE, OF ST. LOUIS PARK, MINNESOTA, ASSIGNOR TO THE MONITOR DRILL COMPANY, A CORPORATION OF MINNESOTA.

GRAIN-DRILL.

1,017,319.   Specification of Letters Patent.   Patented Feb. 13, 1912.

Application filed January 3, 1911. Serial No. 600,555.

*To all whom it may concern:*

Be it known that I, OTTO GEORGE RIESKE, a citizen of the United States, residing at St. Louis Park, in the county of Hennepin and State of Minnesota, have invented certain new and useful Improvements in Grain-Drills, of which the following is a specification.

My present invention relates particularly to the construction of double disk grain drills in which provision is made for delivering the grain into a furrow which is opened by drawing two disks, set at a proper angle to each other, through the soil. The present invention relates more particularly to the construction of the boot and standard of such a double disk grain drill, and to the means for insuring delivery of the grain into the furrow at the proper point.

It is understood that the disks are supported in such a way that they maintain a proper angle to each other and so that their edges are brought into contact at a proper point for opening the furrow to best advantage. The disks are rotatably carried so that they rotate as they are drawn through the soil, although the point of contact between their edges maintains a practically uniform position with respect to the frame of the device. It will be understood that in the ordinary construction the new disks are of such diameter with respect to the frame as to operate to best advantage, and the frame and other parts of the grain drill are suitably shaped and proportioned to obtain the best results with the new or large disks. However, as the latter decrease in diameter owing to wear, a large space is generally left between the disks and the frame of the grain drill, thus increasing the tendency for dirt, mud, and other obstructions to clog into these open spaces, thereby reducing the efficiency of the drilling operation and increasing its cost. For this reason also the permissible amount of wear of the disks has been limited to a considerable extent so that the disks must be thrown away before they have performed the maximum amount of service.

In the customary construction of grain drills, the grain is delivered down between the disks by means of a suitable spout which must be flexibly attached to the drill in order to compensate for movements of the latter with respect to the grain boxes owing to irregularities in the surface of the soil. Owing to the movements of the spout the grain is not always delivered at the proper point in the furrow and sometimes it does not drop into the same each time the dropping mechanism operates, because it sometimes falls on to the standard which supports the disk, or on the hubs, collecting at these points during several dropping operations and then suddenly falling into the furrow. This irregularity of grain delivery causes an irregularity in planting because a large number of seeds are deposited in one place.

I have discovered that the point at which the grain is delivered from the spout influences to a large degree the evenness with which it will fall into the furrow, for the following reasons: If the grain is delivered between the disks at a point such that it strikes them where they are descending in their rotation, (see arrows in Fig. 1) then the disks will assist in carrying the grain down into the furrow, whereas if it strikes the disks at a point where they are ascending in their rotation, then they will tend to lift the grain up so that it will not fall immediately into the furrow. In general, the grain should be delivered between the disks at a point in advance of their centers of rotation, although it might be possible to secure the proper relation between the point of grain delivery and disks to obtain the best delivery of grain into the furrow even when the point of grain delivery is somewhat behind the center of disk rotation.

One of the objects of my invention is to arrange the frame of the grain drill in such a way as to assist in guiding the grain down into the furrow always at the best point with respect to the drill.

Other objects of my invention are to provide a grain drill of simple construction and particularly one which may be formed from pressed steel or similar material; to provide a grain drill having the necessary resiliency to operate properly through different classes of soil; to provide a frame for the grain drill which will maintain the disk edges always in contact at substantially the same point with respect to the frame; to provide a grain drill which may be adjusted from time to time as the disks wear in diameter so as to maintain them in such position relative to the frame as to reduce to a minimum the space between the disk edges and the frame; to so arrange the frame and associated parts as to assist in guiding the grain into the furrow at the proper point and at the same time to strengthen the frame by the very mechanism which is used for assisting in guiding the grain.

Other objects and uses will appear from a detailed description of the invention which consists in the features of construction and combination of parts hereinafter described and claimed.

In the drawings, Figure 1 shows a side view of my improved form of boot and standard, the near disk being removed, and a partition being shown in place for assisting in guiding the grain into the furrow; Fig. 2 shows a construction similar to Fig. 1, the disk being broken off, and the partition which aids in guiding the grain being suitably formed to reinforce and stiffen the standard with respect to the boot; Fig. 3 shows a modified construction in which the standard and boot are not made integral, but in which the former is hinged to the latter, the grain delivery partition being properly arranged to act as a reinforcing member for holding the standard in proper position with respect to the boot; and Fig. 4 is a view similar to Fig. 3, the diameter of the disk being reduced by wear, and the point of disk attachment being raised, by swinging up the standard, so as to reduce the clearance between the disk and boot to a minimum amount; and Fig. 5 shows a detail of the connection of the partition to the standard.

In the embodiment of my present invention, the frame of my grain drill comprises a boot of curvature similar to that of the edges of new disks. To the forward end of this boot I attach a drag bar in any suitable manner, and to the rear end, or on the same, I attach or form a standard to which the disks are attached. This standard is so formed and positioned that the disks will bear the proper relation to the boot. In order to adjust and compensate for changes in diameter of the disks, I provide means for moving the bearing end of the standard toward and away from the boot. In case the standard and boot are integrally formed, then they should be of such material that this adjustment may be made by bending the standard with respect to the boot the necessary amount. In one of the modifications of my present invention, I hinge the standard to the boot so that the necessary adjustment can be made any number of times without deterioration of the metal.

In order to assist in guiding the grain from the delivery spout into the furrow at the proper point, in accordance with the previous discussion, I provide a partition which is suitably attached to either the boot or the standard, or to both. This partition extends in general from the boot down approximately to the bearing of the standard, and lies behind the grain spout so that it will deflect the grain forward. Owing to the adjustability of the end of the standard with respect to the boot, it is desirable that means be provided for reinforcing the forward end of the standard with respect to the boot, although such reinforcement is not necessary. I have discovered that the grain guiding partition may also be used to secure this reinforcement. Also when thus used the partition may be used to secure an exact spacing of the end of the standard with respect to the boot.

Referring now to the drawings, in Fig. 1, the number 5 designates the boot. At its forward end 6 it is bent out at substantially right angles to provide an arm 7 to which the drag bar may be attached. At its rear end 8, it is bent in at substantially right angles to provide a standard 9 to the end of which disks 10 are attached, the disk of the near side being removed to more clearly show the standard and boot beneath. It will be understood that in the construction shown in Figs. 1 and 2, the standard and boot are integrally formed, preferably from pressed steel of a channel shaped cross section, since this construction possesses certain advantages in reduced cost of manufacture, increased stiffness, durability, and simplicity.

In this specification, I do not concern myself particularly with the exact attachment of the disks to the standard, inasmuch as these details of construction are more fully described and are claimed in a co-pending application filed and executed by me of even date herewith.

In the preferred construction, a telescopic grain spout 11 is provided for aiding in securing a proper delivery of the grain. This spout may be passed down through a suitable hole in the web of the channel of the boot and serves to deliver the grain down near the bearing. It will be understood that this telescopic spout may oscillate up and down between the disks a certain amount, because of the movements of the latter, and because of the flexible attachment of the spout to the grain drill. In order to insure a delivery of the grain into the furrow at the proper point with respect to the disks, I provide a partition 12 (Fig. 1) which extends sidewise substantially from disk to disk and vertically substantially from the boot to the standard. In the construction illustrated in Fig. 1 this partition is in the form of an angle having its arms 13 riveted or otherwise suitably attached to the boot. If desired, the construction might be reversed and the arm might be attached to the standard instead of the boot.

In the construction illustrated in Fig. 1 this partition serves chiefly the function of guiding the grain down in the proper manner, and insuring a delivery of grain in advance of the partition.

In Fig. 2, I show a construction in which the partition serves also as a reinforcement for stiffening the standard, and for exactly positioning the end of the same with respect to the boot. In this case the partition 14 comprises a bar, the body portion of which is of proper width to extend loosely from one disk to the other, to prevent grain from getting behind it. In its lower end this bar is provided with a neck 15, the lower end of which terminates in a button 16. The web of the standard may be hooked between the button 16 and the shoulder 17 where the body of the partition merges into the neck. This construction is well shown in Fig. 5. The upper end of the partition is in the form of a threaded bolt 18, which passes up through the web of the boot. By means of nuts 19 and 20 the partition may be raised and lowered and locked in any given position with respect to the boot, thus exactly positioning the end of the standard with respect to the same. Furthermore, the partition in this case serves to reinforce the standard at the point where the greatest strains come upon it. If desired, an auxiliary grain guide 14<sup>a</sup> may be attached to the reinforcing partition 14.

In the construction illustrated in Figs. 3 and 4, the standard 21 is hinged to the boot 22. In this case the standard and boot are each preferably of channel shaped cross section, and the hinged connection is made by extending the webs of one member over those of the other and passing a bolt 23 clear through from web to web. Obviously, it might be difficult to secure the necessary rigidity of the standard with respect to the boot in this manner, unless some reinforcement were provided. I have therefore discovered that the reinforcing partition such as is illustrated in Fig. 2 is peculiarly adapted for use in the hinged construction of Fig. 3.

It will be understood that as the disks continue in service they wear down in diameter as shown in Fig. 4. As they do so the nuts 19 and 20 may be adjusted to raise the bearing end of the standard until the upper portions 24 of the disks are close enough to the boot. By this hinged construction I am enabled to secure such adjustment of the disks as may be necessary from time to time without in any way deteriorating the metal of the frame of the drill and the partition which is desirable for guiding the grain serves also to reinforce the drill frame and hold the standard in proper position with respect to the boot.

It will be understood that it is desirable on account of simplicity and cheapness of construction to form the drill frame from pressed steel, although I in no way limit myself to such material. The desirability of using this material, however, is enhanced by reason of the peculiar stresses coming upon the several parts and the relation of the standard to the boot. I wish it to be particularly understood also that the partition which I provide serves a number of important functions in that it assists in guiding the grain into the furrow by preventing the grain from striking the disks where they are rising, in that it serves to reinforce the standard with respect to the boot, and in that it serves to space the standard with respect to the boot, in order to compensate for wear of the disks.

I claim:

1. In a grain drill, the combination of a boot, a downwardly extending standard on the end of the same, a pair of disks rotatably mounted on the standard, and an adjustable reinforcing member between the disks and connected at one end to the standard and adjustably secured at the other end to the boot.

2. In a grain drill, the combination of a boot, a downwardly extending standard hinged to the rear end of the same, a disk mounted on the standard, and a reinforcing adjustment member extending from the standard to the boot.

3. In a grain drill, the combination of a boot, a downwardly extending standard hinged to the rear end of the same, a pair of disks rotatably mounted on the inner end of the standard, and a reinforcing adjustment member connected at one end to the standard and at its other end adjustably secured to the boot.

4. In a grain drill, the combination of a boot, a downwardly extending standard on one end of the same, a pair of co-acting disks rotatably mounted on the standard, an independent grain delivery spout terminating at a point between the disks, and a grain guide partition between the disks and behind the grain delivery spout and downwardly extending from the boot commencing at a point between the standard and the spout.

5. In a grain drill, the combination of a boot, a downwardly extending standard on the end of the same, a pair of disks mounted on the standard, an independent grain delivery spout terminating at a point to deliver grain between the disks, and a reinforcing partition between the disks and behind the grain delivery spout and in advance of the standard, and extending from the lower end of the standard to the boot.

6. In a grain drill, the combination of a rearwardly extending boot, a downwardly extending standard on the rear end of the same, a pair of disks suitably mounted on the end of the standard, and means for raising and lowering the end of the standard toward and away from the boot to compensate for changes in the diameter of the disks.

7. In a grain drill, the combination of a boot, a downwardly extending standard on the rear end of the same, a disk suitably mounted on the lower end of the standard, and means for raising and lowering the end of the standard toward and away from the boot.

8. In a grain drill, the combination of a boot, a downwardly extending standard on the rear end of the same, a disk suitably mounted on the standard, a reinforcing member extending from the lower end of the standard to the boot, and means for raising and lowering the reinforcing member to raise and lower the end of the standard with respect to the boot.

9. In a grain drill, the combination of an arched boot of curvature similar to that of the edge of a disk, a downwardly extending standard on the rear end of the boot, a disk on the lower end of the standard, and means for raising and lowering the end of the standard to maintain the edge of the disk adjacent to the boot, thereby reducing the space between the edge of the disk and the boot.

10. In a grain drill, the combination of a boot of curvature similar to that of the edge of a disk, and arching upwardly and rearwardly, a drag bar attachment on the forward end of the same, a downwardly extending standard on the rear end of the same, a disk suitably mounted on the lower end of the standard, and means for raising and lowering the end of the standard toward and away from the boot to maintain the edge of the disk adjacent to the boot in the forward portion of the same.

11. In a grain drill, the combination of a boot, a downwardly extending standard on the end of the same, a pair of disks mounted on the standard, an independent grain delivery spout terminating at a point to deliver grain between the disks, and a reinforcing partition between the disks behind the grain delivery spout and in advance of the standard, one end of said partition being secured to the boot and the other end of the partition being loosely connected to the lower end of the standard.

12. In a grain drill, the combination of a boot, a downwardly extending standard secured to the same, and a reinforcing partition having one end secured to the boot and the other end loosely connected to the lower end of the standard.

13. In a grain drill, the combination of a boot, a downwardly extending standard secured to the same, a pair of disks mounted on the standard, a grain delivery spout terminating at a point to deliver grain between the disks, and a reinforcing grain guide partition between the disks, behind the grain delivery spout and in advance of the standard, one end of said partition being secured to the boot and the other end of the partition being loosely connected to the lower end of the standard.

OTTO GEORGE RIESKE.

Witnesses:
 BERNICE G. WHEELER,
 HARRY D. KILGORE.

Copies of this patent may be obtained for five cents each, by addressing the "Commissioner of Patents, Washington, D. C."